(12) United States Patent
Swanson et al.

(10) Patent No.: US 11,176,847 B2
(45) Date of Patent: *Nov. 16, 2021

(54) INJECTOR TRAINING DEVICE

(71) Applicant: Antares Pharma, Inc., Ewing, NJ (US)

(72) Inventors: Kevin D. Swanson, Plymouth, MN (US); Julius Sund, Plymouth, MN (US)

(73) Assignee: Antares Pharma, Inc., Ewing, NJ (US)

( * ) Notice: Subject to any disclaimer, the term of this patent is extended or adjusted under 35 U.S.C. 154(b) by 71 days.

This patent is subject to a terminal disclaimer.

(21) Appl. No.: 16/666,825

(22) Filed: Oct. 29, 2019

(65) Prior Publication Data

US 2020/0066185 A1    Feb. 27, 2020

Related U.S. Application Data

(63) Continuation of application No. 16/017,418, filed on Jun. 25, 2018, now Pat. No. 10,490,104, which is a continuation of application No. 14/774,106, filed as application No. PCT/US2014/023883 on Mar. 12, 2014, now Pat. No. 10,013,895.

(60) Provisional application No. 61/778,937, filed on Mar. 13, 2013.

(51) Int. Cl.
    *G09B 23/28*    (2006.01)
(52) U.S. Cl.
    CPC .................................. *G09B 23/285* (2013.01)
(58) Field of Classification Search
    CPC .............................. G09B 23/28; G09B 23/285
    USPC ........ 434/262, 267, 268, 272; 604/134, 135, 604/192–196
    See application file for complete search history.

(56) References Cited

U.S. PATENT DOCUMENTS

| 4,986,816 A | 1/1991 | Steiner et al. |
| 5,071,353 A | 12/1991 | van der Wal |
| 5,195,983 A | 3/1993 | Boese |
| 5,567,160 A | 10/1996 | Massino |
| 6,969,372 B1 | 11/2005 | Halseth |

(Continued)

FOREIGN PATENT DOCUMENTS

| EP | 0425003 A1 | 5/1991 |
| WO | 2012023938 A1 | 2/2012 |

OTHER PUBLICATIONS

Examiner Requisition dated May 11, 2017 for Canadian Patent Application No. 2,903,498, 4 pages.

(Continued)

*Primary Examiner* — Kurt Fernstrom
(74) *Attorney, Agent, or Firm* — Morgan, Lewis & Bockius LLP

(57) ABSTRACT

A training device for training a user on the operation of an auto-injector that dispenses a medicament. A needle guard is slidable from a first extended position relative to a housing prior to operation of the training device, to a retracted position during operation of the training device, and to a second extended position after operation of the training device. An actuation assembly controls the movement of the needle guard from the retracted position to the second extended position. A lock locks the needle guard in the second extended position. A safety is proximate a proximal end of the housing and prevents movement of the needle guard from the first extended position to the retracted position in a storage position. The needle guard is moveable into the retracted position with the safety in an armed position. The safety resets the lock upon returning the safety to the storage position.

21 Claims, 11 Drawing Sheets

(56) References Cited

U.S. PATENT DOCUMENTS

| | | |
|---|---|---|
| 7,682,155 B2 | 3/2010 | Raven |
| 9,443,445 B2 | 9/2016 | Laurusonis |
| 2007/0111175 A1 | 5/2007 | Raven et al. |
| 2008/0059133 A1 | 3/2008 | Edwards et al. |
| 2008/0249477 A1 | 10/2008 | Paproski |
| 2014/0018744 A1 | 1/2014 | Holmqvist |
| 2014/0288529 A1 | 9/2014 | Baker |
| 2015/0235571 A1 | 8/2015 | Alexandersson |

OTHER PUBLICATIONS

Supplementary European Search Report dated Jul. 26, 2016 in connection with EP Application No. 14778736.0.
International Search Report and Written Opinion for PCT/US14/23883 dated Jul. 10, 2014.

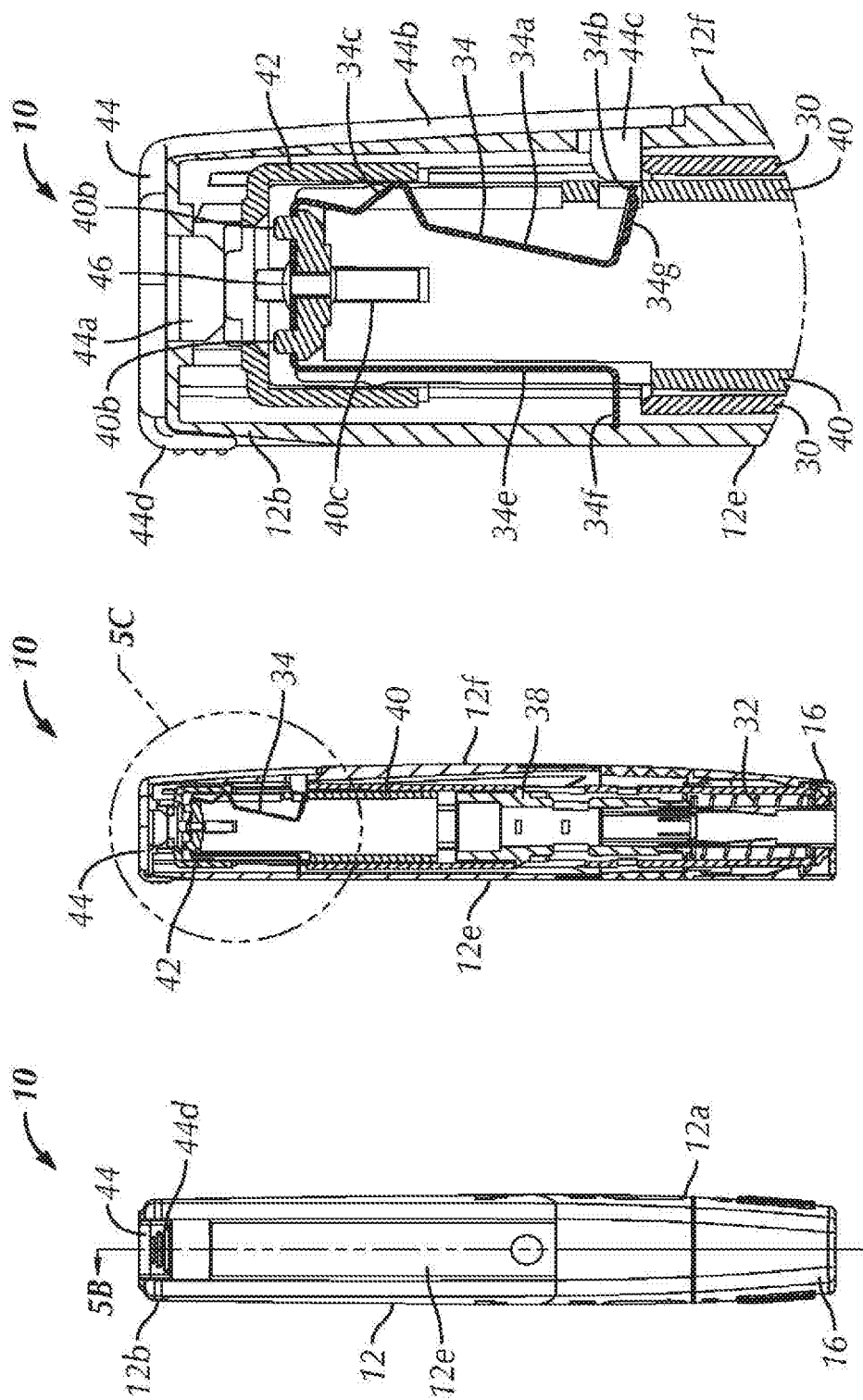

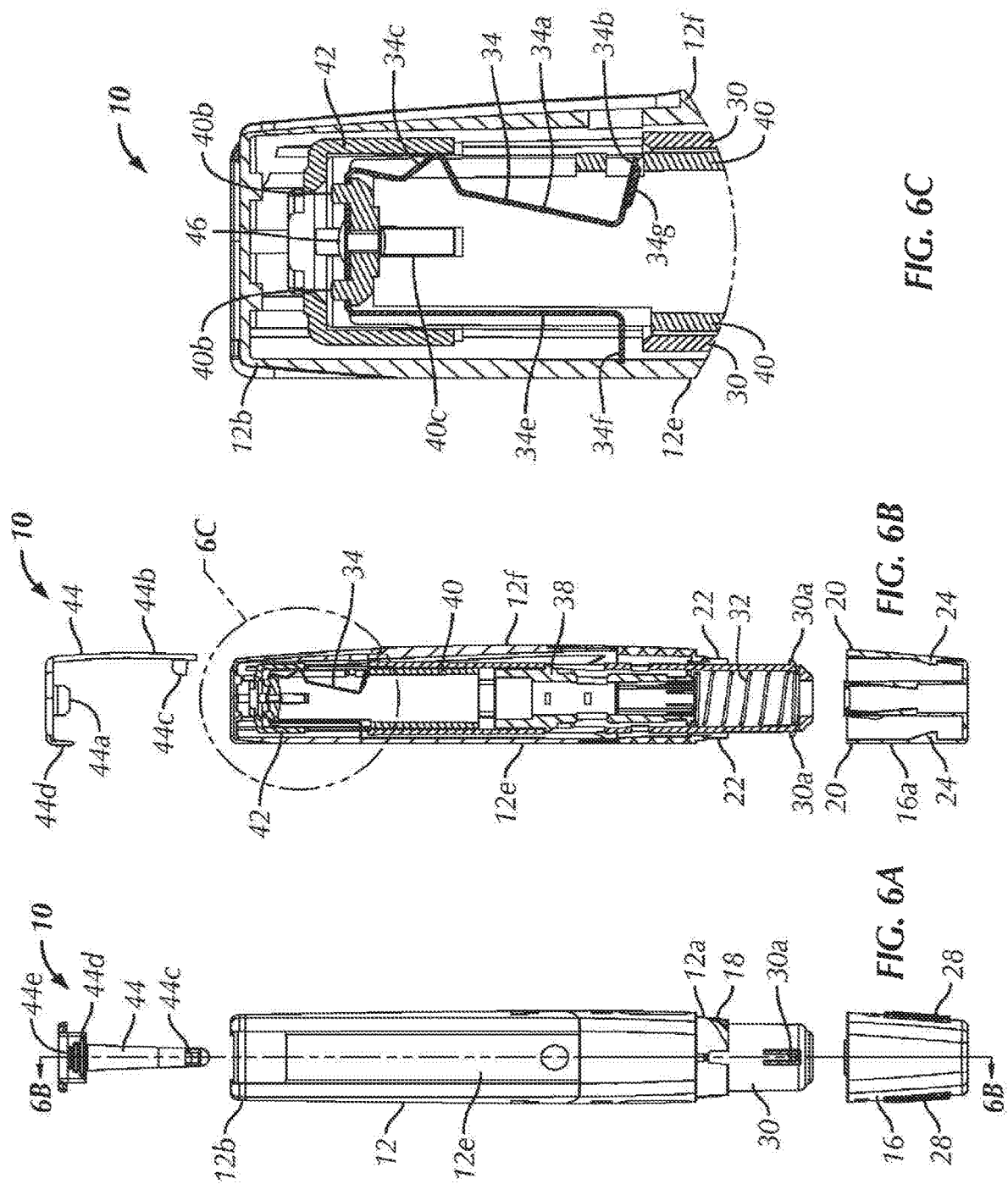

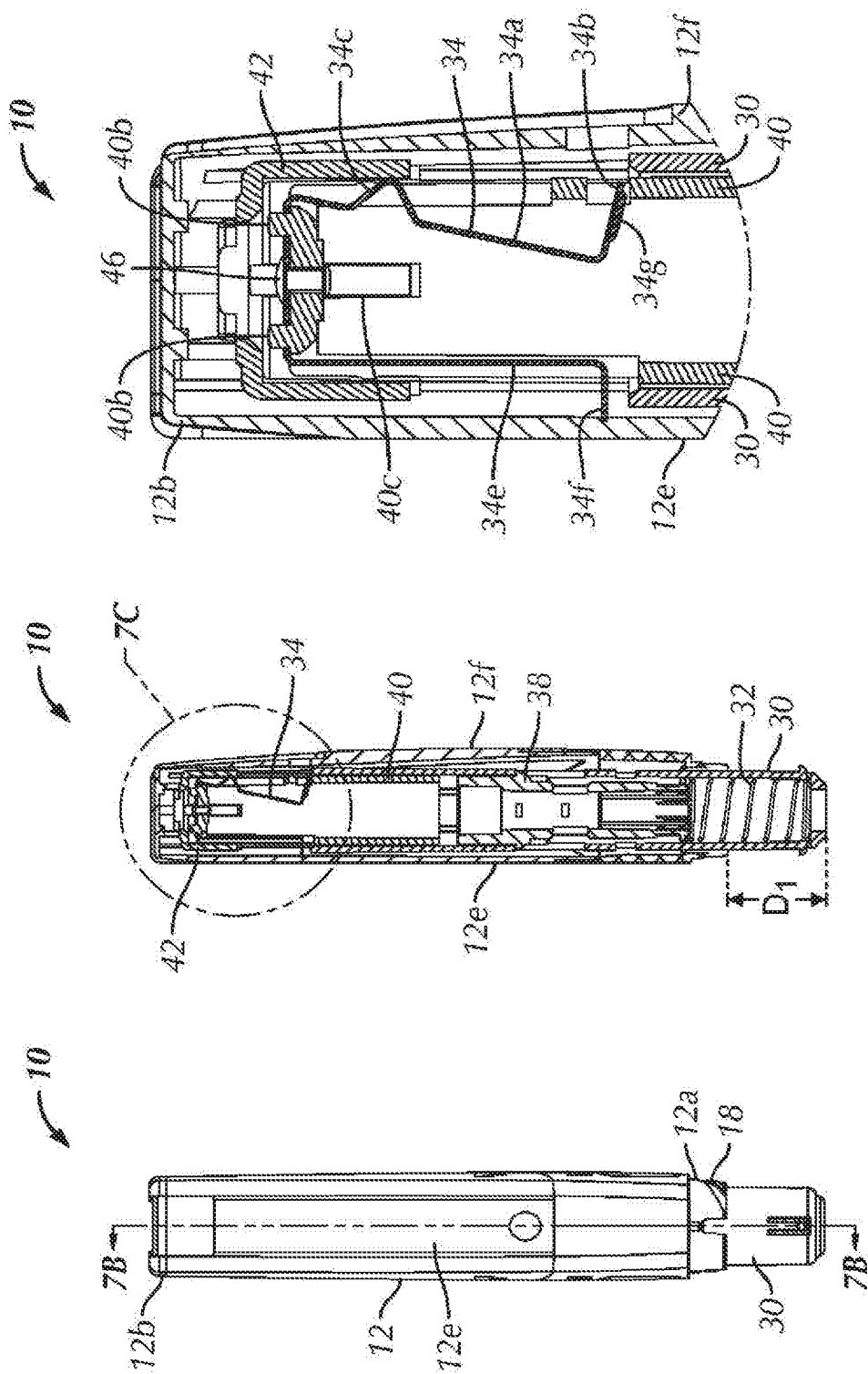

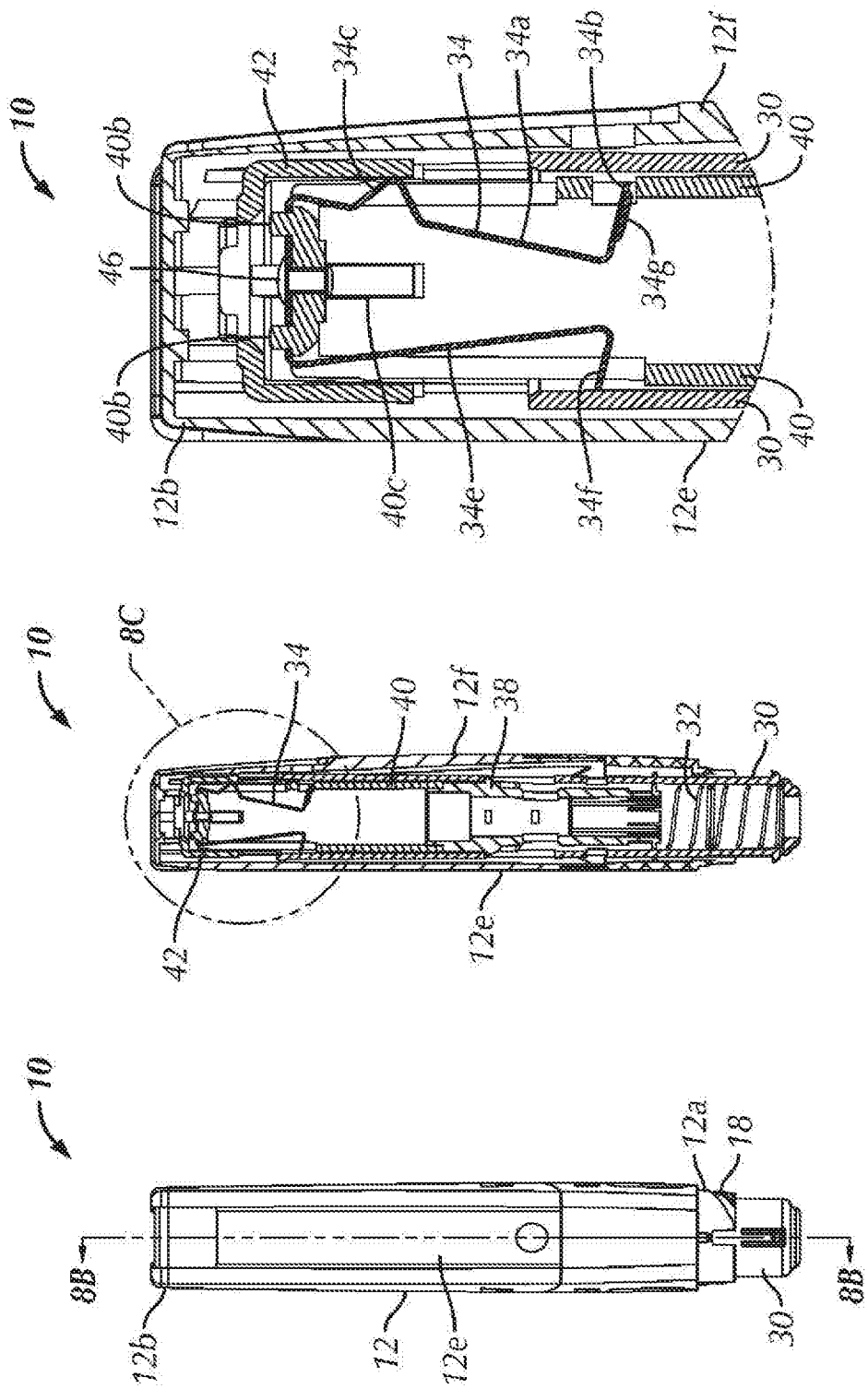

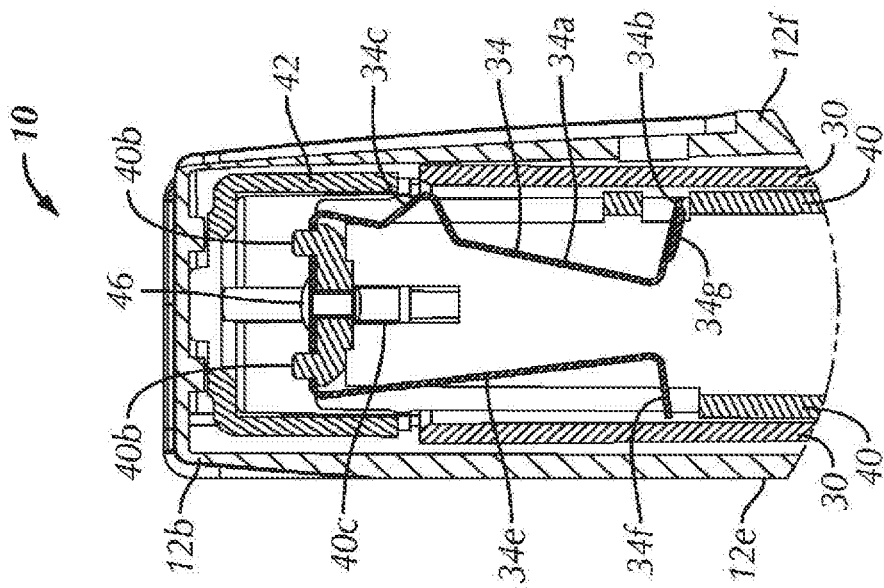
FIG. 9C
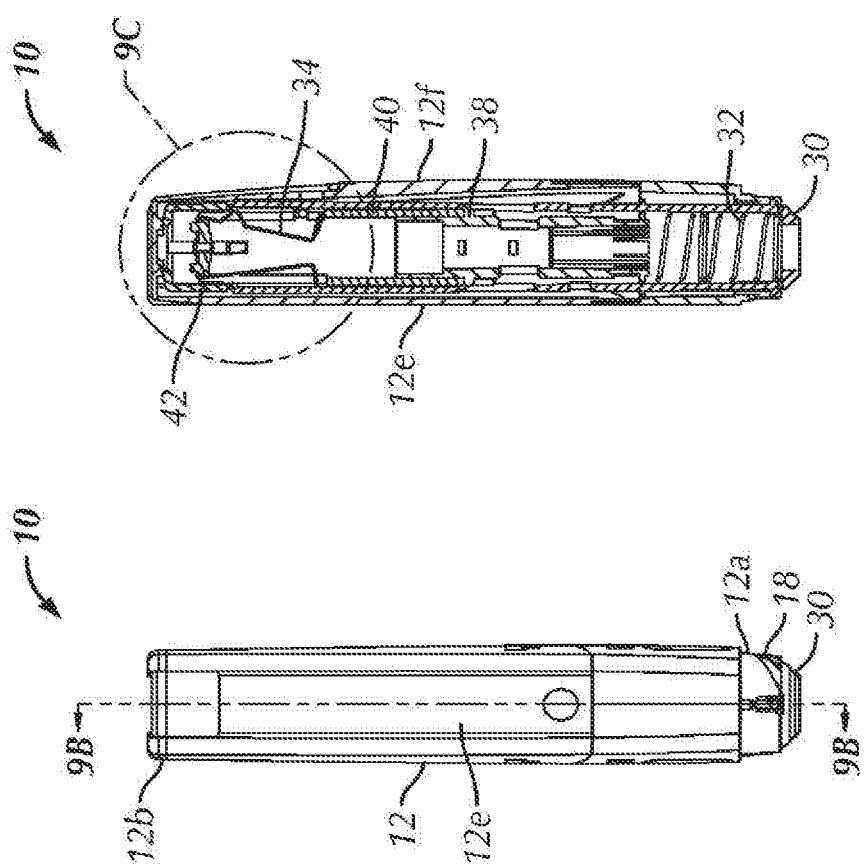
FIG. 9B
FIG. 9A

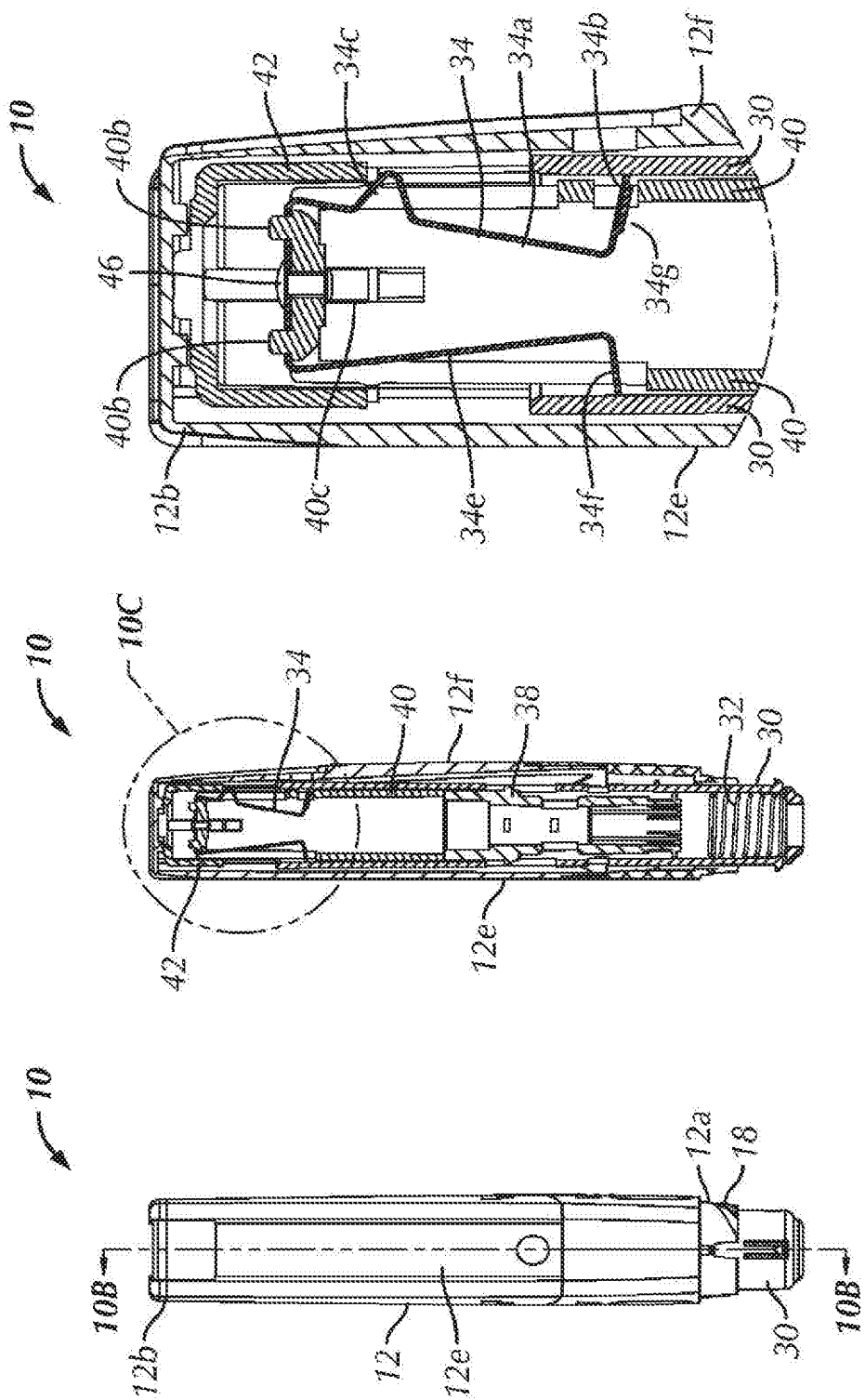

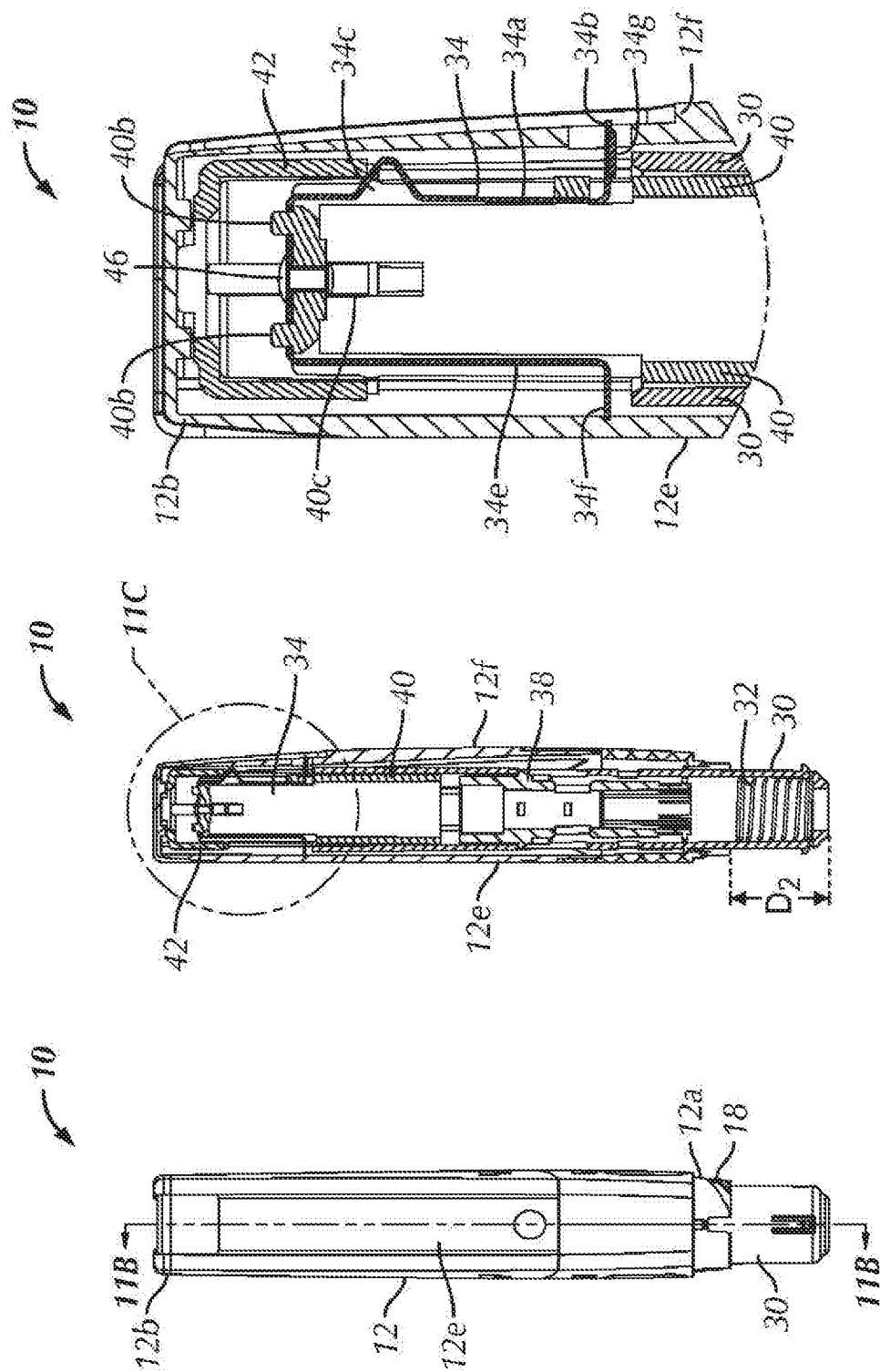

INJECTOR TRAINING DEVICE

CROSS-REFERENCE TO RELATED APPLICATIONS

This application is a continuation of U.S. patent application Ser. No. 16/017,418, filed Jun. 25, 2018, which is a continuation of U.S. patent application Ser. No. 14/774,106, filed on Sep. 9, 2015, now U.S. Pat. No. 10,013,895, which is a U.S. National Stage Entry of International Patent Application PCT/US2014/023883, filed on Mar. 12, 2014, which in turn claims the benefit of U.S. Provisional Patent Application No. 61/778,937 filed Mar. 13, 2013 entitled "Injector Training Device", which are incorporated by reference herein in their entirety.

BACKGROUND OF THE INVENTION

The present invention generally relates to an injector training device and, more particularly, to a training device for an auto-injector.

Automatic injectors are devices for enabling an individual to self-administer a dosage of a liquid medicament subcutaneously or intramuscularly.

A typical auto-injector has a housing, inside of which is a cartridge containing medicament. During use, a needle extends from the auto-injector into the user such that the medicament is subsequently forced through the needle and into the user. After delivery of the dose of medicament into the injection site, a needle shield may safely cover and shield the used needle tip from further use. In other auto-injectors, the device is needleless and the medicament is delivered through the skin by a jet injection.

It is often important that the user of an auto-injector learn its proper operation and become comfortable with its use. Users should, not hesitate to inject themselves, either from fear of using the device or for lack of knowledge in the proper use of the device, especially during a critical moment when an injection is required. However, it is impractical for individuals to train with automatic injectors by repeatedly injecting themselves. Thus, there is a need for a device that simulates the operation of an auto-injector whereby the user can practice and become familiar with the auto-injector's operation prior to dispensing any medicament. Training with such a device may help to prevent improper administering of the medicament, improper orienting of the auto-injector, and premature removal of the auto-injector prior to the full dispensing of the medicament.

SUMMARY OF THE INVENTION

In one embodiment there is a training device for training a user on the operation of an auto-injector that dispenses a medicament, the training device comprising: a housing having a distal end and a proximal end; a needle guard slidably received with the distal end of the housing, the needle guard slidable from a first extended position relative to the housing prior to operation of the training device, to a retracted position relative to the housing during operation of the training device, and to a second extended position relative to the housing after operation of the training device; an actuation assembly coupled to the needle guard, the actuation assembly having a biasing member and a lock, the actuation assembly controlling the movement of the needle guard from the retracted position to the second extended position, the lock locking the needle guard in the second extended position in a locked position; and a safety proximate the proximal end of the housing, the safety preventing movement of the needle guard from the first extended position to the retracted position in a storage position, the needle guard moveable into the retracted position with the safety in an armed position, the safety resetting the lock upon returning the safety to the storage position.

In one embodiment, the lock is a leaf spring. In one embodiment, the leaf spring includes a first leg and a second leg. In one embodiment, the leaf spring includes only a first leg. In one embodiment, the first leg includes a radially extending lock tab that restricts movement of needle guard relative to housing in the second extended position, and the second leg includes a radially extending resistance tab that provides a resistance force that must be overcome to move the needle guard to the retracted position. In one embodiment, the first leg includes a radially extending lock tab that restricts movement of needle guard relative to housing in the second extended position. In one embodiment, the first leg includes a projection proximal to the lock tab, in one embodiment, the leaf spring is attached to the actuation assembly by a fastening means. In one embodiment, the fastening means for attaching the leaf spring is riveted to the actuation assembly is a rivet. In one embodiment, the actuation assembly includes a trigger, the trigger retaining the lock in the storage position, the needle guard sliding the trigger off of the lock when the needle guard is moved from the first extended position to the retracted position. In one embodiment, the safety slides the trigger back over the lock between the locked position and the storage position. In one embodiment, the safety is removably coupled to the housing, removing the safety from the housing allows the user to urge the needle guard into the retracted position in the armed position, and reattaching the safety to the housing resets the lock to the storage position.

In one embodiment, the needle guard extends from the distal end of the housing in the first extended position a distance equal to a distance the needle guard extends from the distal end of the housing in the second extended position, in one embodiment, a predetermined force, in addition to the force of the biasing member, must be exerted on the needle guard relative to the housing to move the needle guard out of the first extended position. In one embodiment, a first projection of the safety extends into the proximal end of the housing and a second projection of the safety extends into a sidewall of the housing in the storage position. In one embodiment, the training device does not include a needle. In one embodiment, the training device does not contain medicament. In one embodiment, the training device is not capable of injecting medicament.

BRIEF DESCRIPTION OF THE SEVERAL VIEWS OF THE DRAWINGS

The following detailed description of embodiments of an injector training device, will be better understood when read in conjunction with the appended drawings of an, exemplary embodiment. It should be understood, however, that the invention is not limited to the precise arrangements and instrumentalities shown.

In the drawings:

FIG. 5A is a roar elevational view of the training device of FIG. 1 shown in a storage position;

FIG. 5B is a side cross sectional view of the training device shown in FIG. 5A taken along line A-A;

FIG. 5C is an enlarged partial side cross sectional view of the training device shown within section B of FIG. 5B;

FIG. 6A is a rear elevational view of the training device of FIG. 1 shown in an armed position showing the safety and safety cap, removed from the training device;

FIG. 6B is a side cross sectional, view of the training device shown in FIG. 6A taken along line A-A;

FIG. 6C is an enlarged partial sidle cross sectional view of tier training device shown within section B of FIG. 6B;

FIG. 7A is a rear elevational view of the training device of FIG. 1 shown in an armed position;

FIG. 7B is a side cross sectional view of the training device shown in FIG. 7A taken along line A-A;

FIG. 7C is an enlarged partial side cross sectional view of the training device shown within section B FIG. 7B;

FIG. 8A is a rear elevational view of the training device of FIG. 1 shown in a partially retracted position;

FIG. 8B is a side cross sectional, view of the training device shown in FIG. 8A taken along line A-A;

FIG. 8C is an enlarged partial side cross sectional view of the training device shown within section B of FIG. 8B;

FIG. 9A is a rear elevational view of the training device of FIG. 1 shown in a retracted position;

FIG. 9B is aside cross sectional view of the training device shown in FIG. 9A taken along line A-A;

FIG. 9C is an enlarged partial side cross sectional view of the training device shown within section B of FIG. 9B;

FIG. 10A is a rear devotional view of the training device of FIG. 1 shown in a partially extended position;

FIG. 10B is a side cross sectional view of the training device shown in FIG. 10A taken along line A-A;

FIG. 10C is an enlarged partial side cross sectional view of the training device shown within section B of FIG. 10B;

FIG. 11A is a rear view elevational view of the training device of FIG. 1 shown in a locked position;

FIG. 11B is a side cross sectional view of the training device shown in FIG. 11A taken along line A-A;

FIG. 11C is an enlarged partial side cross sectional view of the training device shown within section B of FIG. 11B;

DETAILED DESCRIPTION OF THE INVENTION

Figure 1:
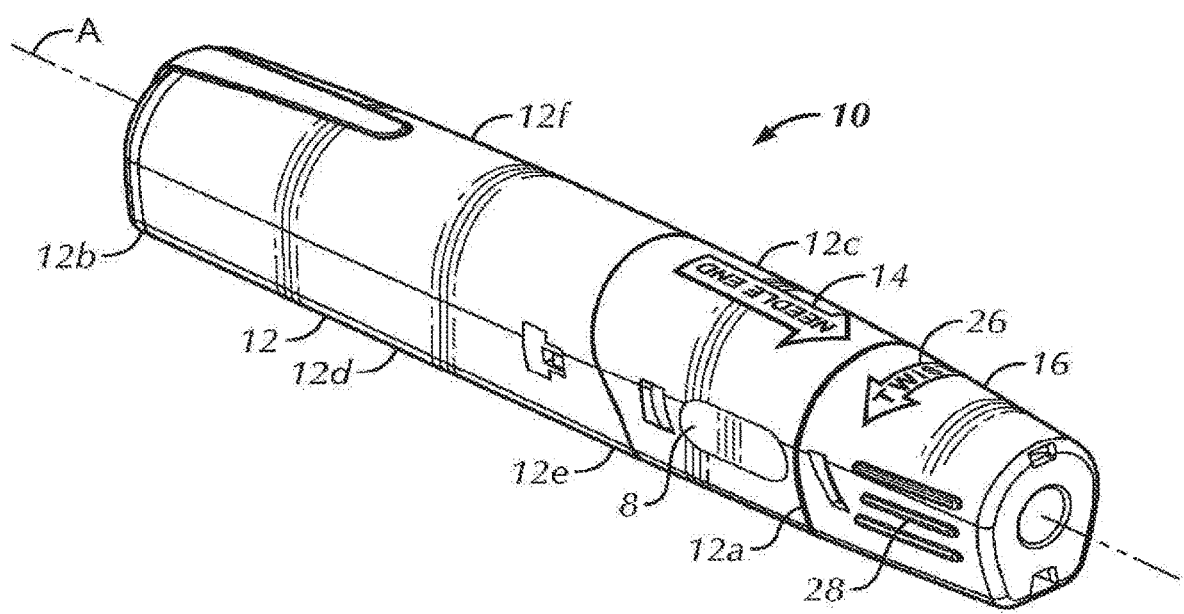
FIG. 1 is a perspective view of a training device in accordance with an exemplary embodiment of the present invention shown in a storage position.

Referring to the drawings in detail, wherein like reference numerals indicate like elements throughout, there is shown in FIGS. 1-12C a training device, generally designated 10, in accordance with an exemplary embodiment of the present invention.

Training device 10 is a training tool used to educate users on the proper orientation and operation of a corresponding auto-injector. The auto-injector of interest may require steps to arm the device, a certain amount of force t activate injection and/or make noises that a user may not be familiar with particularly before using an auto-injector for the first time. Training device 10 simulates the operation of an auto-injector so that a user can practice administering a medicament and get comfortable with how the auto-injector works without actually using the needle or dispensing the medicament. Unlike the auto-injector, training device 10 contains no medicament or needle assembly. Training device 10 may have the same look an feel as a particular auto-injector or a particular type of auto-injector so a user can become comfortable with using the auto-injector by practicing with training device 10. Training device 10 may be resettable to allow a user to repeat the simulated injection operation until the user becomes comfortable with its operation. Additionally, training device 10 may be used to train multiple individuals on the proper operation of an auto-injector. As such, family members can be educated on the proper operation of the auto-injector to assist the user. Furthermore, training device 10 may be used as a training aid in a hospital, clinic, or physician's office.

Training device 10 may be used to train users on a variety of auto-injector configurations. In one embodiment, training device 10 is used to train users on use of Antares Pharma's VIBEX™ auto-injector. In one embodiment, training device 10 is used to train users on an auto-injector that injects methotrexate. In one embodiment, training device 10 is used to train users on an auto-injector that injects epinephrine. In one embodiment, training device 10, though resettable, is used to train users on single use auto-injectors. In other embodiment, training device 10 is used to train users on an auto-injector similar to those disclosed in U.S. Patent Application Publication Nos. 2012/0157965 and 2011/0144594 and U.S. Provisional Patent No. 61/607,339 which are hereby incorporated by reference in their entirety.

Figure 2:
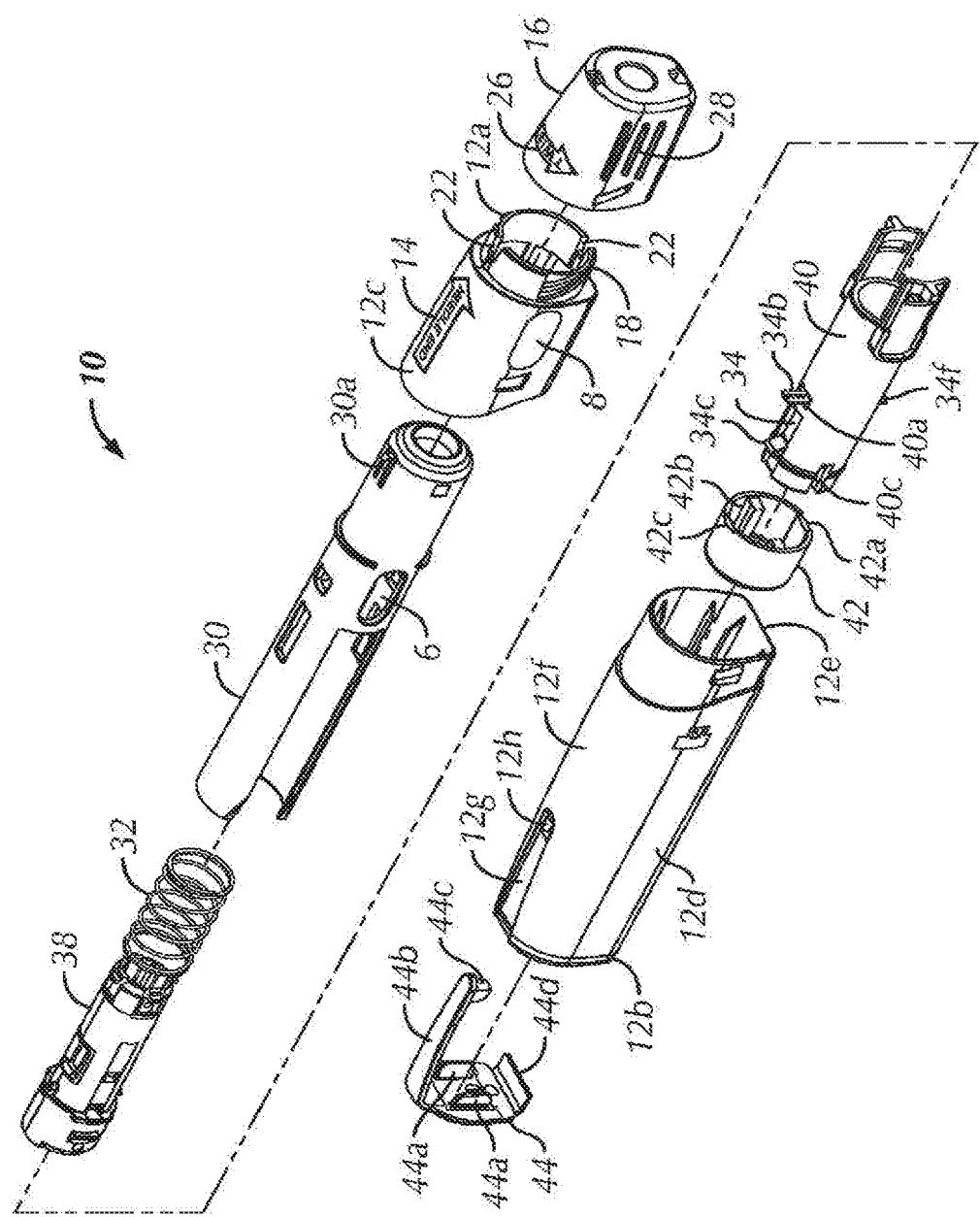
FIG. 2 is an exploded perspective view of the training device shown in FIG. 1.

Referring to FIGS. 1 and 2, training device 10 includes a housing 12 extending along longitudinal axis A and has a distal end 12a and proximal end 12b. As used herein, movement along longitudinal axis A or in a direction generally parallel to longitudinal axis A is referred to as moving longitudinally, distally and/or proximally. It is noted that, in the context of this disclosure, the terms "distal" and "proximal" are used in reference to the position of training device 10 relative to a user of the injection device when merely held by a user. Accordingly, a point located distal to a second point would be further from the user (e.g., towards an injection end of training device 10) and vice versa. Also as used herein, movement in a direction perpendicular to longitudinal axis A is referred to as moving radially. Housing 12 couples, contains and/or protects the remaining components of training device 10. Housing 12 may be shaped and configured to be grasped by a single hand of a user. In one embodiment, housing 12 has a flattened rear side 12e and a rounded front side 12f. In such an embodiment, during use a user may grasp training device 10 with their pinky proximate distal end 12a and their thumb proximate proximal end 12b such the user's finger tips engage the flattened side 12e and the user's palm wraps around rounded side 12f. The user may, however, grasp housing 12 in any radial orientation relative to their hand that feels comfortable.

Housing 12 may be comprised of a distal portion 12c and a proximal portion 12d that are secured to one another during assembly by a fastener such as a snap fit. In other embodiments, distal portion 12c, and proximal portion 12d of housing 12 are coupled to one another in any manner such a thread, adhesive, or press fit. In other embodiments, distal portion 12c and proximal portion 12d of housing 12 are integrally formed. Housing 12 may be transparent such that the user can see the interior components. In other embodiments, housing 12 is partially or entirely opaque to conceal one or more interior components. Housing 12 may include indicia 14, such as for example an arrow with the phrase "needle end" to indicate which end of training device 10 is the simulated injection end. In other embodiments, indicia 14 may include trademarks, drug information and/or injection instructions such a list of steps for how to use training device 10.

Training, device 10 may include a safety cap 16 coupled to distal end 12a of housing 12. Certain auto-injectors may include a safety cap similar to safety cap 16 to cover and protect the needle tip before use. Safety cap 16 may be provided so that a user practices with removing a similar safety cap from an auto-injector. Safety cap 16 may be coupled to distal end 12a of housing via threads 18 such that safety cap 16 must be twisted relative to housing 12 to remove safety cap 16 from distal end 12a of housing 12. In one embodiment, threads 18 extend partially around the perimeter of distal end 12a such that only a partial rotation of safety cap 16 relative to housing 12 is required to remove safety cap 16 from housing 12.

Safety cap 16 may be further coupled to distal end 12a of housing 12 via one or more fasteners such as a snap fit. In one embodiment, the fasteners include a projection 20 (see FIG. 6B) extending radially inward from safety cap 16 that are configured to snap fit into corresponding grooves or apertures 22 in housing 12 (see FIG. 2). In one embodiment, the fasteners include projections 24 extending radially inward from safety cap 16 that are configured to engage corresponding projections 30a extending radially outwardly from a needle guard 30 (see FIG. 6B). One or more fasteners coupling safety cap 16 and housing 12 may be configured to prevent safety cap 16 from being removed from housing 12 solely by pulling safety cap 16 distally from housing 12. In one embodiment, coupling and recoupling safety cap 16 with housing 12 creates an audible click to indicate that the safety cap 16 has been secured or removed respectively. In one embodiment, twisting safety cap 16 relative to housing 12 allows for safety cap 16 to be decoupled and removed from housing 12. In one embodiment, pulling safety cap 16 distally from housing 12 without twisting safety cap 16 relative to housing 12 will not result in safety cap 16 decoupling from housing 12. The coupling between safety cap 16 and housing 12 may include other configurations such as the inverse projection/aperture configuration shown in the drawings and/or other devices such as detents, latches or magnets.

Safety cap 16 may include indicia 26 such as for example an arrow with the word "twist" to indicate how to remove safety cap 16 from housing 12. In other embodiments, indicia 26 may include trademarks and/or injection instructions.

Safety cap 16 may include one or more grips 28 to help a user grasp and twist safety cap 16 relative to housing 12. Grips 28 may include one or more projections or textured areas that increase the friction between a user's fingers and safety cap 16. In one embodiment, safety cap 16 includes two grips 28 diametrically opposed from one, another.

Housing 12 may include one or more viewing windows 8 configured to allow a user to see inside the housing 12. A corresponding auto-injector may have similar windows to allow a user to see the level of medicament. One or more components such as needle guard 30 may include corresponding apertures 6 that align with windows 8. Windows 8 may be comprised of a transparent material. In one embodiment, a larger portion of the housing 12 is comprised of a transparent material and a sticker or decal covers the housing 12 leaving windows 8 exposed. Two windows 8 may be provided that are generally diametrically opposed from one another so that a user can see at least partially through the training device 10. In one embodiment, windows 8 are provided on the side surfaces. In other embodiments, windows 8 are provided on the top and bottom.

Referring to FIG. 2, in one embodiment, training device 10 includes a needle guard 30 slidably received with distal end 12a of the housing 12. Certain auto-injectors may include a needle guard similar to needle guard 30 to cover and protect a needle before and/or after use. In an auto-injector, the needle guard may extend over the needle before use, expose the needle in a retracted position during use and re-cover the needle after use. Such needle guards may require a predetermined amount of force to expose needle and then lock out over the needle following use to prevent or at least reduce accidental needle sticks. Training device 10 may include a needle guard 30 similar to a needle guard of certain auto-Injectors so that a user is familiar with its operation.

As will be described in further detail below, in some embodiments, needle guard 30 is slidable from a first extended or storage position relative to housing 12 prior to operation of training device 10 (see FIGS. 5A-7C), to a retracted position relative to housing 12 during operation of training device 10 (see FIGS. 8A-9C), to a second extended or locked position relative to housing 12 after operation of training device 10 (see FIGS. 10A-12C) and resettable to the storage position (see FIGS. 12A-12C).

Referring to FIG. 2, training device 10 may include an actuation assembly coupled to needle guard 30 configured to control movement of needle guard 30 relative to housing 12. The actuation assembly may include a biasing member 32 and a lock 34. In one embodiment, biasing member 32 is disposed between needle guard 30 and lock 34 to urge needle guard 30 longitudinally away from lock 34. Lock 34 may be coupled to a latch 40. Latch 40 may be coupled to housing 12. In one embodiment, latch 40 does not move relative to housing 12. A sleeve 38 may be provided, between biasing member 32 and latch 40. In other embodiments, biasing member 32 is coupled directly to latch 40. In one embodiment, biasing member 32 is a helical compression spring. In other embodiments, biasing member 32 is an elastomer, one or more springs of any configuration or a gas powered device.

Referring to FIG. 2, lock 34 may be controlled by a trigger 42. In one embodiment, trigger 42 is controlled by a safety 44 and the needle guard 30. In one embodiment, trigger 42 is slidably coupled to a proximal end of latch 40 to hold lock 34 at least partially within latch 40 in the storage mode and allow lock 34 to at least partially extend radially outwardly through latch 40 in the locked position. Trigger 42 may include a flattened portion 42a. In one embodiment, trigger 42 includes diametrically opposed flattened portions 42a. In one embodiment, flattened portion 42a is configured to slidably engage a projection 34c of lock 34. In one embodiment, trigger 42 is keyed to latch 40 to prevent trigger 42 from rotating, relative to latch 40 and keep flattened portion 42a aligned with projection 34c of lock 34. In one embodiment, trigger 42 includes a notch 42c proximate the distal end of flattened portion 42a. In one embodiment, notch 42c is shaped and configured to receive a projection 34c of lock 34, in one embodiment, trigger 42 includes a projection 42b that extends into a slot 40c in latch 40. In one embodiment, trigger 42 includes two diametrically opposed projections 42b that extends into diametrically opposed slots 40c in latch 40. In one embodiment, trigger 42 is generally symmetrical about a plane parallel with longitudinal axis A.

In one embodiment, safety 44 includes at least one projection 44a that extends into housing 12 to prevent trigger 42 from sliding proximally relative to latch 40 and lock 34. In one embodiment, at least one projection 44a is coupled to housing via a snap fit. Safety 44 may include a projection 44c that engages with needle guard 32. In one embodiment, projection 44c extends into, housing 12 and prevents needle guard 30 from moving proximally toward proximal end 12b. In one embodiment, projection 44e extends from an arm 44b. In one embodiment, arm 44b extends into slot 12g in housing 12 such that arm 44b is generally flush with the outer contour of housing 12. In one embodiment, safety 44 includes a tab 44d that extends distally from safety 44. In one embodiment, tab 44d is generally parallel with arm 44b. In one embodiment, tab 44d is diametrically opposed to arm 44b. In one embodiment, tab 44d includes one or more grips 44e (see FIG. 6A) to help a user push safety 44 from housing 12. Grips 44e may include one or more projections, or textured areas that increase the friction between a user's fingers (such as a thumb) and tab 44d.

Figure 3:
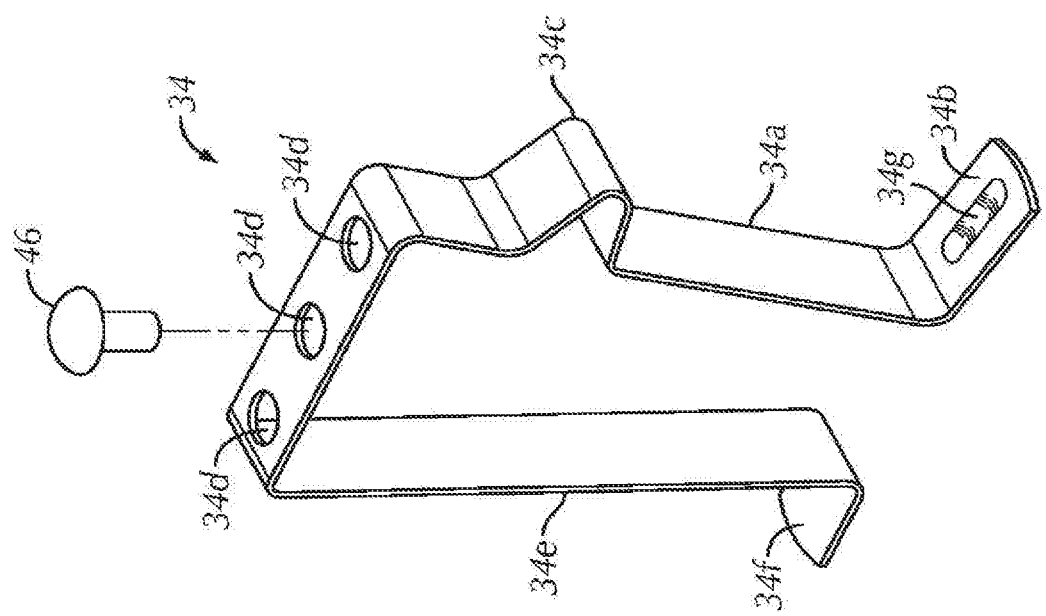
FIG. 3 is a perspective view of a leaf spring in accordance with an exemplary embodiment of the present invention.

Referring to FIGS. 2 and 3, lock 34, in one embodiment, is a leaf spring. Lock 34 may be coupled to latch 40. In one embodiment, lock 34 is fastened to latch 40. In one embodiment, lock 34 is fastened to latch 40 by a rivet 46. Lock 34 may include one or more apertures 34d. In one embodiment, rivet 46 extends through aperture 34d. Lock 34 may include at least one additional aperture 34d. In one embodiment, a projection 40b extending from latch 40 may extend through one or more additional apertures 34d (see FIG. 5C). In one embodiment, lock 34 includes three apertures 34d. In one embodiment, one or more apertures 34d on either side of rivet 46 receive a projection from latch 40 to prevent lock 34 from twisting relative to latch 40. In other embodiments, lock 34 is fastened to, latch 40 by one or more of a screw, adhesive, spot weld and/or is coupled to latch 40 by the configuration of latch 40 (e.g., latch 40 may include a slot that lock 34 is slid through).

Referring to FIG. 3, lock 34 may include one or more cantilevers arms forming one or more leaf springs. In one embodiment, lock 34 has a generally flat proximal end and one or more distally extending arms forming one or more leaf springs. Lock 34 may include a lock arm 34a. In one embodiment, leek arm 34a is coupled to latch 40 such that lock arm 34a extends toward distal end 12a. Lock arm 34a may include a lock tab 34b. In one embodiment, lock tab 34b extends radially from lock arm 34a. Lock tab 34b may include a support 34g. Support 34g may be provided to lock tab 34b to add rigidity and reduce or prevent lock tab 34b from bending such as when lock tab 34b is abutted by needle guard 30 as discussed below. In one embodiment, support 34g is formed by an indent in lock tab 34b. In one embodiment, support 34g extends distally from lock tab 34b. In other embodiments, support 34g may be formed by additional material or thickness added to lock tab 34b.

Lock arm 34a may include a projection 34c proximal to lock tab 34b. Projection 34c may be sloped at least on a side facing the proximal direction. In one embodiment, projection 34c is generally V-shaped. In on embodiment, projection 34c is tapered as it extends radially from lock arm 34a. In one embodiment, projection 34c is formed by bends (e.g., three) in lock are 34a. In other embodiments, projection 34c may be additional material or an attachment extending from lock arm 34a. Lock 34 may include a resistance arm 34e. In one embodiment, resistance arm 34e is generally parallel with lock arm 34a. Resistance arm 34e may include a resistance tab 34f. In one embodiment, resistance tab 34f extends radially from resistance arm 34c. In some embodiments, the angle between resistance tab 34f and resistance arm 34e may be set depending on the desired resistance for retracting needle guard 30. In one embodiment, resistance tab 34f extends in the opposite direction than lock tab 34b. In other embodiments, such as lock 34' shown in FIG. 4, resistance arm 34e is omitted entirely.

Referring to FIG. 2, in one embodiment, projection 34c extends through and from latch 40. In one embodiment, lock tab 34b extends radially through and from latch 40. In one embodiment, lock tab 34b extends radially through an aperture 40a in latch 40 such that a portion of latch 40 extends over lock arm 34a in between lock tab 34b and projection 34c. In one embodiment, resistance tab 34f extends radially through and from latch 40.

Referring to FIGS. 5A-5C, training device 10 is shown in a storage position. The storage position, in some embodiments, is the initial position or the position that the user begins with training device 10. As shown in FIGS. 5A and 5B, safety cap 16 may be coupled to distal end 12a of housing 12 in the storage position. Safety cap 16 may be detached from and reattached to housing 12 without impacting the storage position of the other components (e.g., without causing movement of needle guard 30 relative to housing 12). In other embodiments, removing safety cap 16 may cause training device 10 to enter an armed position. In the storage position, in one embodiment, projection 44c of safety 44 extends into housing 12 and radially past a portion of needle guard 30 such that needle guard 30 abuts projection 44c and is prevented from moving proximally relative to housing 12. In the storage position, in one embodiment, trigger 42 is coupled to the proximal end of latch 40 such that it extends over projection 34c. In one embodiment, with projection 34c pushed radially into latch 40, lock arm 34a is biased further into latch 40 such that lock tab 34b is within latch 40 and out of the traveling path of needle guard 30.

Referring to FIGS. 6A-6C, in one embodiment, once the user is ready to use training device 10, the user will need to manipulate safety 44 to place training device 10 into an armed position. In one embodiment, the armed position (see FIGS. 7A-7C) is when the safety projections 44a on safety 44 no longer are in position to impede the movement of trigger 42 proximally relative to housing 12. In one embodiment, the armed position (see FIGS. 7A-7C) is when needle guard 30 is moveable proximally relative to housing 12. In one embodiment, the armed position is when trigger 42 is moveable by needle guard 30 rotative to latch 40. In an auto-injector, the armed position corresponds to when the user can activate an injection. In one embodiment, removing safety 44 and safety cap 16 from housing 12, in either order, places training device 10 into the armed position. In other embodiments, safety 44 and/or safety cap 16 remain coupled to housing 12 in the armed position and movement or manipulation (e.g., twist or slide) of safety 44 and/or safety cap 16 relative to housing 12 causes training device 10 to enter into the armed position.

In one embodiment, the user grasps housing 12 with one hand and pushes proximally on grips 44e of safety 44 with the thumb of the same hand to decouple safety from housing 12. Safety 44 may be coupled to the housing by one or inure of tab 44d, projections 44a, arm 44b or projection 44c. In one embodiment, the snap fit between projections 44a and housing 12 primarily couples safety 44 to housing 12. In one embodiment, removing projections 44a from housing creates an audible click and/or a tactile feel in the user's hand to indicate that safety 44 has been removed and training device 10 is in the armed position. Once Safety 14 has been removed, in one embodiment, user grasps housing 12 with one hand and grasps safety cap 16 with their other hand and separates safety cap 16 relative to housing 12 to remove safety cap 16 from housing 12. In one embodiment, the user twists safety cap 16 relative to housing 12 to remove safety cap 16 from housing 12. In one embodiment, removing safety cap from housing 12 exposes a portion of needle guard 30 extending from distal end 12a of housing 12.

Referring to FIGS. 7A-7C, training device 10 is shown in the armed position. In the armed position, needle guard 30 may extend from distal end 12a a distance $D_1$. In one embodiment, distance $D_1$ simulates a distance Mat a needle guard would need to be retracted in an auto-injector to expose a needle during injection. Needle guard 30 may be restricted from moving proximally relative to housing 12 by resistance tab 34f extending through latch 40. In one embodiment, when a user grasps housing 12 and pushes the distal end of needle guard 30 against an injection site, needle guard 30 moves proximally relative to housing 12 until needle guard 30 abuts resistance tab 34f. In one embodiment, needle guard 30 moves a predetermined distance before abutting resistance tab 34f. In other embodiments, needle guard 30 initially abuts resistance tab 34f in the armed position. In one embodiment, once needle guard 30 abuts resistance tab 34f a predetermined force is required for needle guard 30 to move relative to housing 12. In one embodiment, continued force on needle guard 30 relative to housing 12 caused by user holding housing 12 and pushing the distal end of needle guard into their skin bends resistance tab 34f and/or resistance arm 34e until resistance arm 34e deflects radially inwardly into latch 40 moving resistance tab 34f out of the path of needle guard 30.

Figure 4:
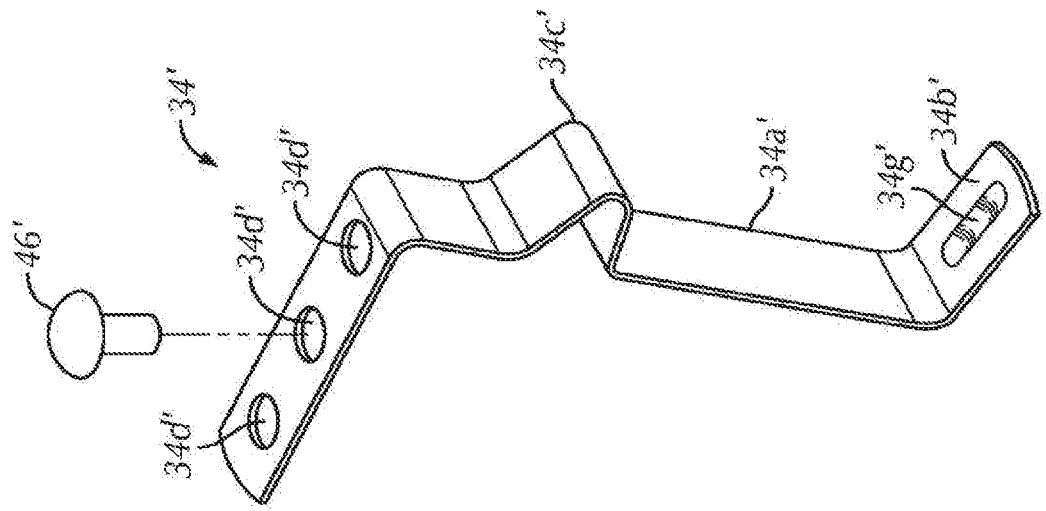
FIG. 4 is a perspective view of a leaf spring in accordance with another exemplary embodiment of the present invention.

Requiring a predetermined force in an auto-injector to move a needle guard relative to housing from the armed position to a retracted or injection position may help prevent accidental needle sticks. Accidental bumps against the distal end of the needle guard do not exert enough force to retract the needle guard and expose the needle. Requiring a predetermined force may also help to ensure that the needle is, fully inserted during use. A user will not be able to slowly insert the needle and prematurely withdraw once they feel the needle piercing their skin due to the speed of injection once the predetermined force is overcome. In other embodiments, resistance tab 34f and the additional predetermined force is omitted such as by using lock 34' as shown in FIG. 4. In one embodiment, only the resistance of biasing member 32 resists movement of needle guard 30 relative to housing 12. In one embodiment, continued force on needle guard 30 relative to housing 12 caused by user holding housing 12 and pushing the distal end of needle guard 30 into their skin allows needle guard 30 to move a distance $D_1$.

Referring to FIGS. 8A-8C, training device 10 is shown as needle guard 30 is being retracted into housing 12. In one embodiment, moving needle guard 30 proximally relative to housing 12 simulates a needle being inserted in the user. As a needle guard in an auto injector is retracted, the needle extends distally from the needle guard penetrating the skin of the user.

Referring to FIGS. 9A-9C, training device 10 is shown in the retracted or injection position. In one embodiment, fully retracting needle guard 30 proximally relative to housing 12 simulates the injection step of an auto-injector. In one embodiment, needle guard 30 is substantially retracted into housing 12 in the retracted position. In one embodiment, as the proximal end of needle guard 30 moves toward and abuts trigger 42, trigger 42 is slid proximally relative to latch 40. In one embodiment, a distal edge of trigger is slid proximally past projection 34c of lock 34. In one embodiment, a distal edge of trigger is slid proximally past the apex of projection 34c.

Referring to FIGS. 10A-10C, training device 10 is shown as biasing member 32 moves needle guard 30 distally relative to housing 12 towards the second extended position. In one embodiment, needle guard 30 automatically moves distally relative to housing 12 once the proximally facing force on needle guard 30 is less than the biasing force of biasing member 32 (e.g., as a user pulls housing 12 from their skin). In one embodiment, the distal end of needle guard 30 remains in contact as the user pulls housing 12 away from their skin. In one embodiment, movement of needle guard 30 distally relative to housing 12 toward the second extended position simulates removal of the auto-injector needle from the user. In one embodiment, movement of needle guard 30 distally relative to housing 12 toward the second extended position allows projection 34c on lock 34 to extend radially from within latch 40.

Referring to FIGS. 11A-11C, training device 10 is shown a locked position. In one embodiment, needle guard 30 is not retractable relative to housing 12 in the locked position. In one embodiment, locking needle guard 30 relative to housing 12 in the locked position simulates the auto-injector after use where the needle guard covers the needle tip and prevents reuse. In one embodiment, needle guard 30 extends from distal end 12a of housing 12 a distance $D_2$. In one embodiment, distance $D_2$ is equal to distance $D_1$ (see FIG. 7B). In other embodiments, distance $D_2$ may be greater or less than distance $D_1$. In one embodiment, once needle guard 30 extends distally longitudinally past lock tab 34b, lock arm 34a is radially biased by the spring force of lock arm 34a towards its natural shape such that lock tab 34b extends through latch 40 and into the sliding path of needle guard 30. In one embodiment lock tab 34b prevents needle guard 30 from retracting or moving proximally relative to housing 12 toward the retracted position.

Figure 12C:
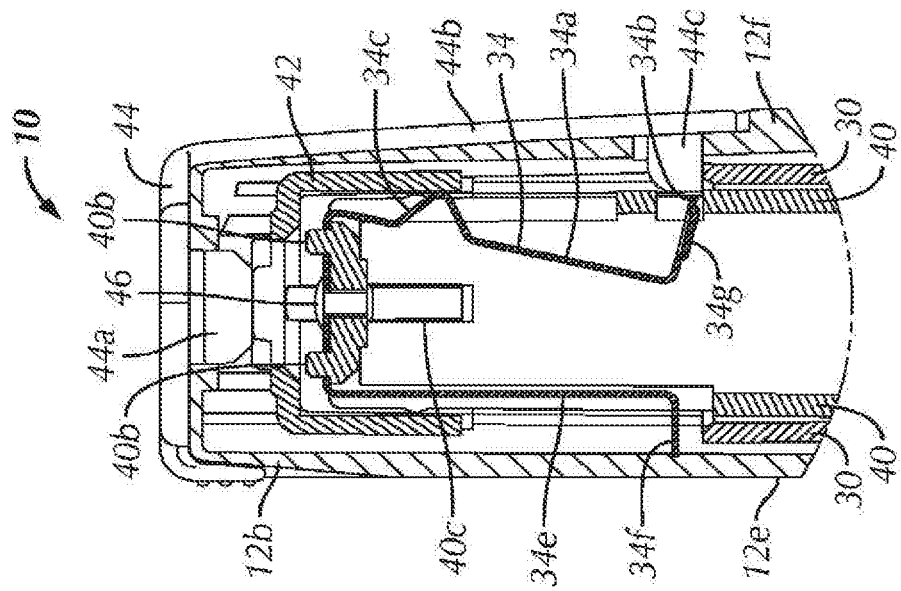
FIG. 12C is an enlarged partial side cross sectional view of the training device shown within section B of FIG. 12B.
Figure 12B:
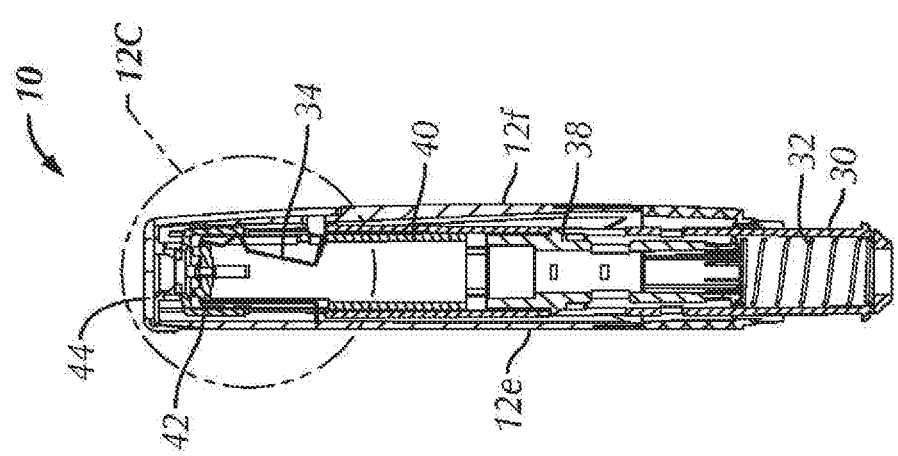
FIG. 12B is a side cross sectional view of the training device shown in FIG. 12A taken along line A-A.
Figure 12A:
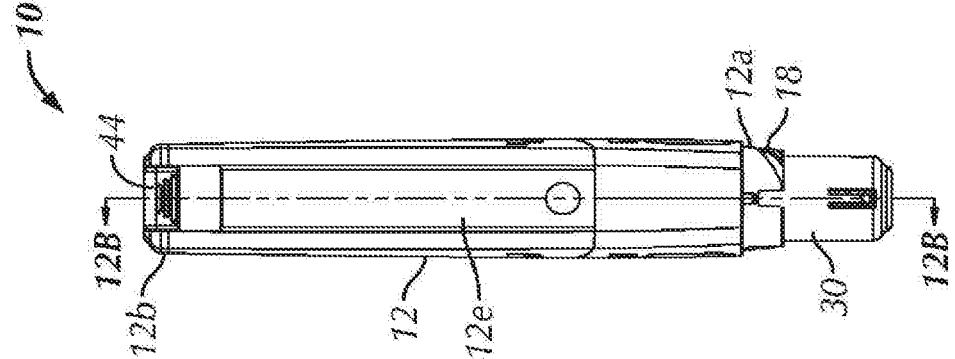
FIG. 12A is a rear elevational view of the training device of FIG. 1 shown in a reset storage position.

Referring to FIGS. 12A-12C, training device 10 is shown in a reset storage position. Safety 44 may be actuated to return training device 10 to the initial or storage position for subsequent training. Though certain auto-injectors may not be reusable, training device 10 may be resettable and used multiple times. In one embodiment, safety 44 is recoupled to housing 12 to move training device 10 from the locked position to the storage position. In one embodiment, projections 44a extend through housing, abut trigger 42 and slide trigger 42 over latch 40. In one embodiment, as trigger 42 slides relative to latch 40, projection 34c of lock 34 extends through notch 42c (see FIG. 2) of trigger 42. In one embodiment, as trigger 42 slides further relative to lately 40, flattened portion 42a of trigger 42 slides over projection 34c to radially bias lock arm 34a inwardly into latch 40 and move lock tab 34b into latch 40 and out of the path of needle guard 30 to reset training device 10. In one embodiment, trigger 42 alone moves lock tab 34b into latch 40. In other embodiments, projection 44c of safety 44 assists in moving lock tab 34b into latch 40. In one embodiment, after safety 44 is coupled to housing 12 and training device 10 is reset to the storage position, safety cap 16 may be recoupled to distal end 42a of housing 12 (see FIGS. 5A-5C). In other embodiments, training device 10 is used again without recoupling safety cap 16.

It will be appreciated by those skilled in the art that changes could be made to the exemplary embodiments shown and described above without departing from the broad inventive concepts thereof. It is understood, therefore, that this invention is not limited to the exemplary embodiments shown and described, but it is intended to cover modifications within the spirit and scope of the present invention as defined by the claims. For example, specific features of the exemplary embodiments may or may not be pan of the claimed invention and various features of the disclosed embodiments may be combined. Unless specifically set forth herein, the terms "a", "an" and "the" are not limited to one element but instead should be read as meaning "at least one".

To the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

We claim:

1. A training device for training a user on the operation of an auto-injector that dispenses a medicament, the training device comprising:
    a housing having a distal end and a proximal end;
    a needle guard slidable relative to the housing from a first extended position prior to operation of the training device, to a retracted position during operation of the training device, and to a second extended position after operation of the training device;
    a lock configured to lock the needle guard in the second extended position;
    a safety coupled to a proximal portion of the housing, the safety preventing movement of the needle guard from the first extended position to the retracted position with the safety in a storage configuration, the needle guard moveable into the retracted position with the safety in an armed configuration; and
    a cap coupled to a distal portion of the housing, the cap configured to prevent movement of the needle guard when the cap is coupled to the distal portion of the housing.

2. The training device of claim 1, wherein the lock is a leaf spring.

3. The training device of claim 2, wherein the leaf spring includes a first leg and a second leg.

4. The training device of claim 3, wherein the first leg includes a radially extending lock tab that restricts movement of the needle guard relative to the housing in the second extended position, and the second leg includes a radially extending resistance tab that provides a resistance force that must be overcome to move the needle guard to the retracted position.

5. The training device of claim 4, wherein the first leg includes a projection proximal to the lock tab.

6. The training device of claim 3, wherein the first leg includes a radially extending lock tab that restricts movement of the needle guard relative to the housing in the second extended position.

7. The training device of claim 2, wherein the leaf spring includes a single leg.

8. The training device of claim 2, wherein the leaf spring is attached to the actuation assembly by a fastening means.

9. The training device of claim 8, wherein the fastening means is a rivet.

10. The training device of claim 1, further comprising:
    an actuation assembly coupled to the needle guard and controlling the movement of the needle guard from the retracted position to the second extended position, wherein the actuation assembly includes a biasing member and a trigger, the trigger retaining the lock in the storage position, the needle guard sliding the trigger off of the lock when the needle guard is moved from the first extended position to the retracted position.

11. The training device of claim 10, wherein the safety slides the trigger back over the lock as the safety moves to the storage configuration.

12. The training device of claim 1, wherein the safety is removably coupled to the housing and removing the safety from the housing allows the user to urge the needle guard into the retracted position when the safety is the in the armed configuration, and reattaching the safety to the housing resets the lock to an unlocked configuration.

13. The training device of claim 1, wherein the needle guard extends from the distal end of the housing in the first extended position a distance equal to a distance the needle guard extends from the distal end of the housing in the second extended position.

14. The training device of claim 4, wherein a predetermined force, in addition to the resistance force of the radially extending resistance tab, must be exerted on the needle guard relative to the housing to move the needle guard out of the first extended position.

15. The training device of claim 1, wherein a first projection of the safety extends into the proximal end of the housing and a second projection of the safety extends into a sidewall of the housing in the storage position.

16. The training device of claim 1, wherein the training device does not include a needle.

17. The training device of claim 1, wherein the training device does not contain medicament.

18. The training device of claim 1, wherein the training device is not capable of injecting medicament.

19. The training device of claim 1, wherein the cap includes a projection configured to engage a corresponding projection on the needle guard.

20. The training device of claim 1, wherein the cap is detachably coupled to the housing.

21. The training device of claim 1, wherein the cap is detachable from the housing and reattachable to the housing without impacting the storage position of safety or needle guard.

* * * * *